US007643984B2

(12) United States Patent
Gentile et al.

(10) Patent No.: US 7,643,984 B2
(45) Date of Patent: *Jan. 5, 2010

(54) METHOD AND SYSTEM FOR SELECTING COMPATIBLE PROCESSORS TO ADD TO A MULTIPROCESSOR COMPUTER

(75) Inventors: Robert Gentile, Beaverton, OR (US); Travis Schaff, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/333,035

(22) Filed: Dec. 11, 2008

(65) Prior Publication Data

US 2009/0099833 A1 Apr. 16, 2009

Related U.S. Application Data

(63) Continuation of application No. 10/722,344, filed on Nov. 24, 2003, now Pat. No. 7,478,032, which is a continuation of application No. 09/083,959, filed on May 22, 1998, now Pat. No. 6,654,714.

(51) Int. Cl.
*G06F 15/16* (2006.01)

(52) U.S. Cl. ............................. 703/27; 710/104; 712/32

(58) Field of Classification Search ................. 703/20, 703/21, 22, 27; 710/104; 711/147, 153; 712/32, 38
See application file for complete search history.

(56) References Cited

U.S. PATENT DOCUMENTS

| 5,574,899 A | 11/1996 | Kinoshita | 707/1 |
|---|---|---|---|
| 5,586,304 A | 12/1996 | Stupek, Jr. et al. | 703/22 |
| 5,671,435 A | 9/1997 | Alpert | 712/38 |
| 5,761,479 A | 6/1998 | Huang et al. | 710/102 |
| 5,852,722 A | 12/1998 | Hamilton | 709/221 |
| 5,960,189 A | 9/1999 | Stupek, Jr. et al. | 395/500.43 |
| 5,974,258 A | 10/1999 | Ferri et al. | 395/712 |
| 6,654,714 B1 | 11/2003 | Gentile et al. | 703/22 |
| 2004/0176943 A1 | 9/2004 | Gentile et al. | 703/27 |

OTHER PUBLICATIONS

Andrew S. Tanenbaum, 'Structured Computer Organization', $2^{nd}$ Edition. © 1984, pp. 10-12.

Bose, S.R. et al. "*Remote DOS Disk Server on a Unix Machine*"; IEEE Region 10 International Conference on EC3—Energy, Computer, Communication and Control Systems (TENCON '91); Aug. 30, 1991; vol. 3; pp. 103-107.

Langan, D.D. and T. J. Scott. "*A Methodology for Fast PC Hard Disk State Restoration*"; Proc. of the 1992 ACM/SIGAPP Symposium on Applied Computing, 1992; pp. 1105-1110.

(Continued)

*Primary Examiner*—Jason Proctor
(74) *Attorney, Agent, or Firm*—Dorsey & Whitney LLP

(57) ABSTRACT

A method and system for using processor compatibility information to select a compatible processor for addition to a multiprocessor computer. A software program is executed on the multiprocessor computer to determine the number of current processors in the multiprocessor computer and the revision number of each processor. A software program that compares the revision numbers of the current processors with processor compatibility information is then executed to determine the revision numbers of processors that are compatible with all current processors.

19 Claims, 7 Drawing Sheets

OTHER PUBLICATIONS

Milne, *"Making Your Server System Scale"*, Network Computing, Mar. 15, 1997, p. 140.

Anonymous, *"OpenVMS DCL Dictionary"*, Oct. 1997, text downloaded from: http://www.openvms.compaq.com:8000/ssb71/9996/9996p052.htm, pp. 5-10.

Bennett, D. *"Booting Linux from EPROM"*; Linux Journal. 1997, Issue 33es, Article 2.

Maple, C. and D. Vince. *"A Framework for and Implementation of Intelligent Task Distribution"*; Proc. Int'l Conference on Parallel Computing in Elec. Eng'g (PARELEC '02); 2002; pp. 195-198.

Intel Corporation, *"AP-485: Application Note: Intel Processor Identification and the CPUID Instruction"*, Order No. 241618-005, Dec. 1996.

| PROCESSOR | COMPATIBLE PROCESSORS |
|---|---|
| 836-88 | 836-16; 836-48; 836-66; 836-78 |
| 936-80 | 936-10; 936-16; 936-26; 936-36; 936-46; 936-56 |
| 936-82 | 936-08; 936-16; 936-32; 936-48; 936-56 |
| 936-84 | 936-16; 936-26; 936-46; 936-56; 936-66; 936-76 |
| 936-90 | 936-10; 936-16; 936-48; 936-56; 936-66; 936-80 |
| 936-96 | 936-16; 936-48; 936-56; 936-80; 936-84 |
| 936-98 | 936-16; 936-56; 936-90; 936-96 |
| 936-99 | 936-16; 936-56; 936-98 |
| 1036-00 | |

*Fig. 3*

METHOD AND SYSTEM FOR SELECTING COMPATIBLE PROCESSORS TO ADD TO A MULTIPROCESSOR COMPUTER

CROSS-REFERENCE TO RELATED APPLICATION

This application is a continuation of pending U.S. patent application Ser. No. 10/722,344, filed Nov. 24, 2003, which is a continuation of U.S. patent application Ser. No. 09/083,959 filed May 22, 1998 and issued as U.S. Pat. No. 6,654,714 on Nov. 25, 2003. These applications and patents are incorporated by reference herein.

TECHNICAL FIELD

The present invention relates to multiprocessor computer systems and, in particular, to the selection of compatible processors to add to a multiprocessor computer system.

BACKGROUND OF THE INVENTION

In order to increase the rate at which a computer system can execute instructions, computer manufacturers have adopted various multiprocessor architectures. First used in mainframe and high-end minicomputers, multiprocessor architectures are now commonly available in lower-end computer systems. Manufacturers commonly sell multiprocessor computer systems with fewer processors than the maximum number of processors that can be included in the system. The purchaser of such a system can later expand the multiprocessor computer system to increase its performance by purchasing additional processors and adding those additional processors to the system.

There are many different types of processors, or CPUs, manufactured for use in computer systems. Generally, a given manufacturer will produce different types of CPUs that each have a unique model number. For example, the Intel microprocessors included in personal computer ("PC") systems include the 8086, 80286, 80386, 80386SX, 80486DX, Pentium, and Pentium II processors. Within a given model number of processor, a manufacturer generally produces many different revisions. A new revision may include fixes to problems recognized in older revisions, and may include enhancements to the functionality and performance of the processor.

Additional processors added to a multiprocessor PC system must, in general, be compatible with the processors already included in the system, both in model number and revision number. Processor manufacturers produce lists or tables that include processor compatibility information. Thus, the owner of a multiprocessor PC system that wishes to expand the system by adding an additional CPU must first determine the model and revision numbers of the CPUs currently residing in the PC system and then use the compatibility information provided by the processor manufacturer to select an additional CPU for purchase that is compatible with the CPUs already residing in the system.

The model and revision numbers of a CPU are generally printed or stamped onto the surface of the CPU. However, modern high-speed CPUs are generally enclosed within heat sinks that obscure the model and revision number information. The heat-sink-enclosed CPU is often additionally obscured by a cooling fan mounted on top of the heat sink. The owner of a PC typically determines the model and revision numbers of the CPUs within the computer system by removing the cooling fan and heat sink. This disassembly process is time-consuming and can subject the CPU and circuit board that contains it both to mechanical damage and to electrical damage due to static discharges.

SUMMARY OF THE INVENTION

An embodiment of the present invention provides a technique for using processor compatibility information to select a compatible processor for addition to a multiprocessor computer. A multiprocessor computer has at least one current processor in a CPU slot within the computer and at least one additional CPU slot in which a new processor can be added. The additional CPU slot may be empty or may contain a CPU that is to be removed in order to add a new processor. Each processor has a revision number that identifies the revision of the processor. Processors in a multiprocessor computer must generally all have compatible revision numbers. In order to determine a set of compatible revision numbers for a processor to add to multiprocessor computer, the technique executes a software program on the multiprocessor computer to determine the number of current processors in the multiprocessor computer and the revision number of each processor. The technique then executes a software program that compares the revision numbers of the current processors with processor compatibility information to determine the revision numbers of processors that are compatible with all current processors.

BRIEF DESCRIPTION OF THE DRAWINGS

FIG. 3 displays a sample portion of a CPU compatibility listing.

DETAILED DESCRIPTION OF THE INVENTION

An embodiment of the present invention provides a method and system for selecting a list of processors that are compatible to the processors included within an expandable multiprocessor computer system. The processor compatibility system includes a computer program that executes on each multiprocessor computer system. When the computer program is executed, it determines the model and revision numbers of all processors currently included in the system. This processor identification computer program then provides the model and revision numbers of the processors to a processor compatibility computer program. The processor compatibility computer program has access to a database of compatibility information for various processors. Using the model and revision numbers of the processors, the processor compatibility computer program scans the database to identify those processors that are compatible. The processor compatibility system then presents the model and revision numbers of the compatible processors to a user so that the user can select which processor to use when upgrading the multiprocessor computer.

Thus, by using the processor compatibility system, a user of a multiprocessor computer system does not need to disassemble the computer system in order to determine model and revision numbers of the CPUs currently included in the computer system, nor does the user need to acquire compatibility tables or lists from the processor manufacturers and manually select processors from the lists that are compatible with the processors currently included in the system.

Figure 1:
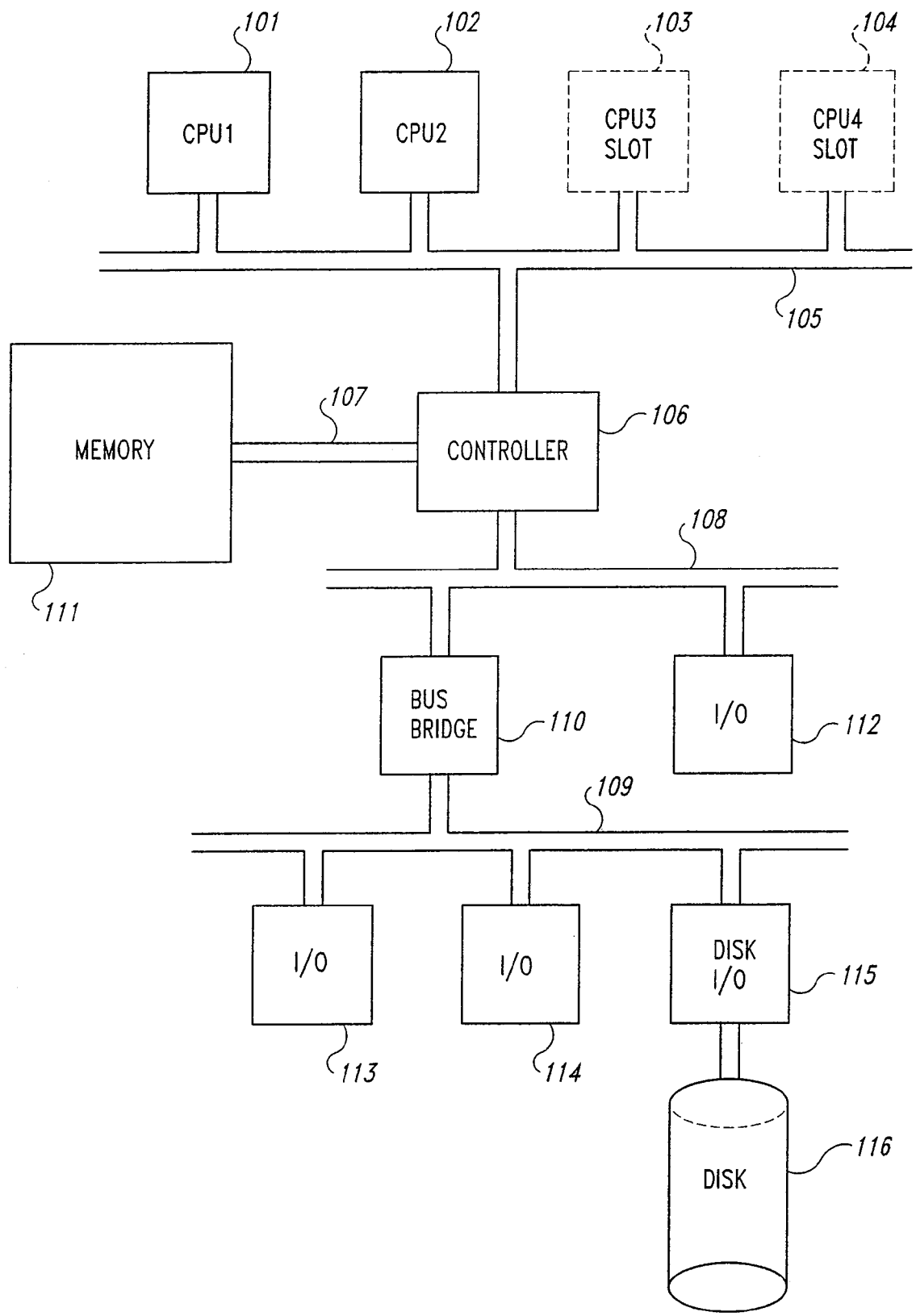
FIG. 1 displays a schematic drawing of a multiprocessor computer system.

FIG. 1 displays a schematic drawing of a multiprocessor computer system. Such a system contains at least one CPU 101 and contains some combination of additional CPUs 102 and expansion slots 103 and 104 where additional CPUs can be added to the system. An expansion slot can include a connection to receive a circuit board that contains a CPU or a socket into which an integrated circuit that implements the CPU can be inserted. The CPUs are connected to remaining system components via a CPU bus 105, a system controller 106, a memory bus 107, a high-speed I/O bus 108, and a lower-speed I/O bus 109 connected through a bus bridge 110. The CPUs 101 and 102 share access to memory 111 and to various peripheral devices 112-115, including a disk controller 115 connected to a hard disk 116. Software programs are generally stored on nonvolatile storage devices, such as the hard disk 116, and are transferred, under control of a CPU, to memory 111 for execution by one or more CPUs.

Figure 2A:
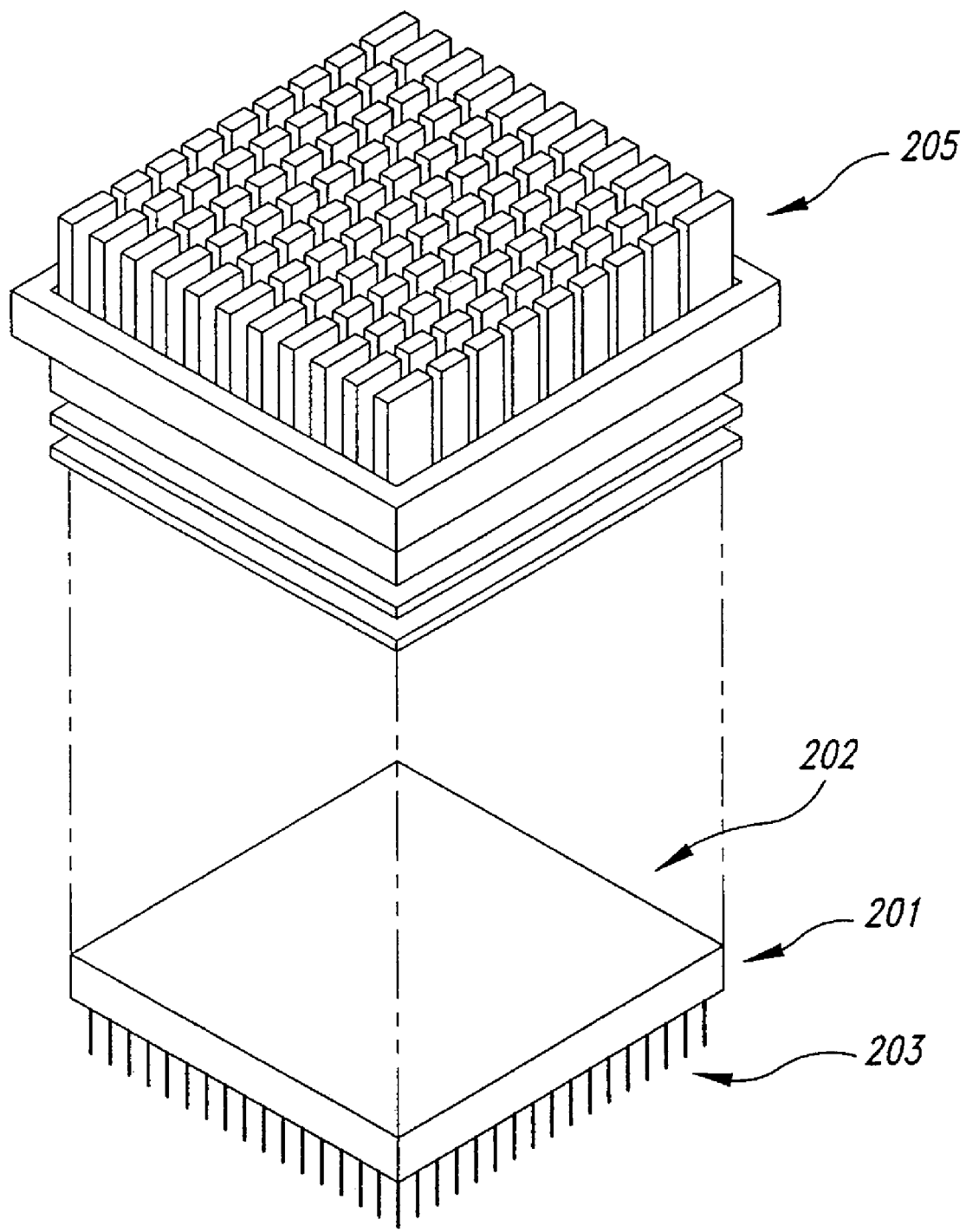
FIGS. 2A and 2B illustrate the heat sink and cooling fan devices that are commonly attached to or mounted over CPUs in order to dissipate the heat generated by the CPU.
Figure 2B:
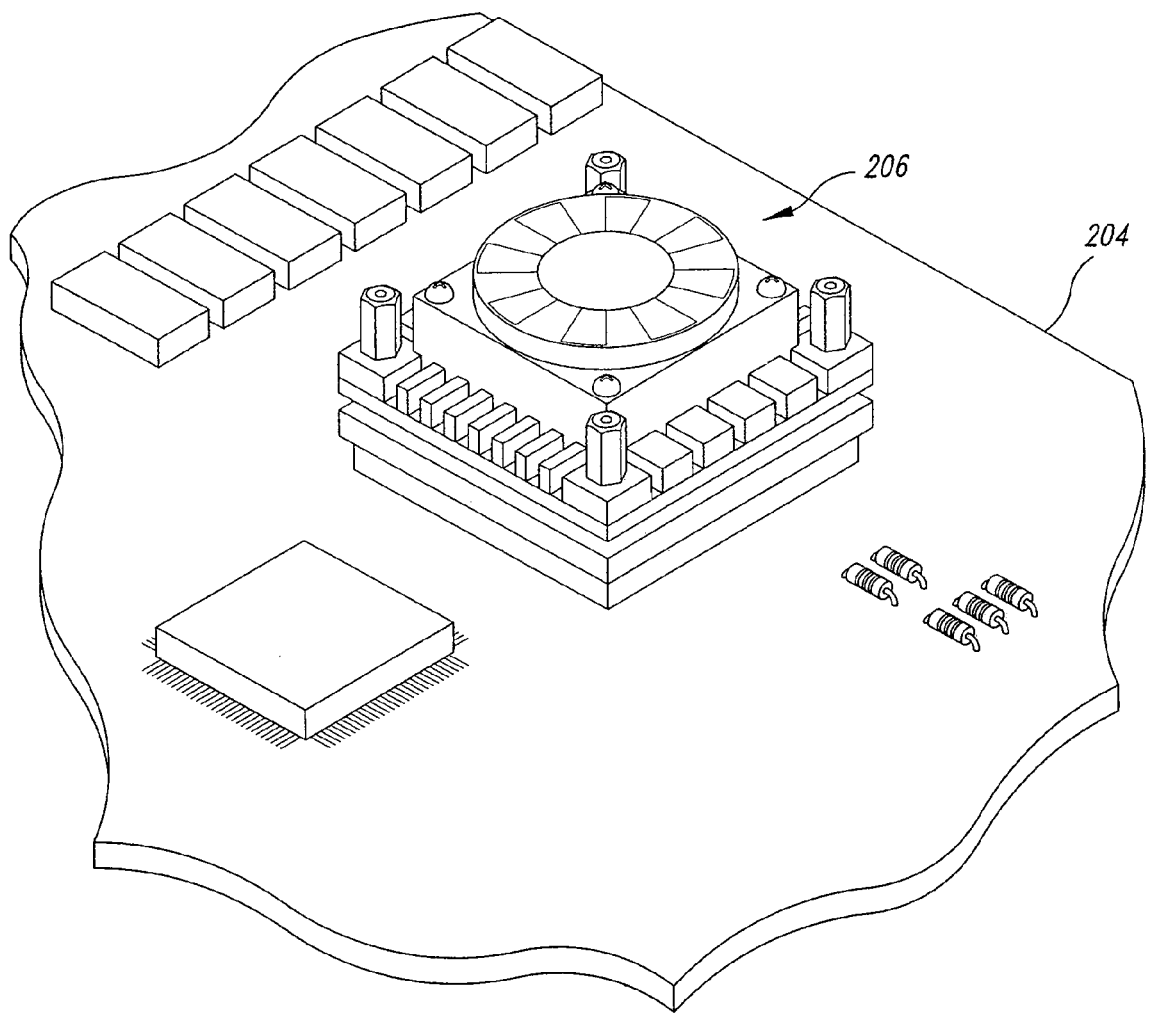

FIGS. 2A and 2B illustrate the heat sink and cooling fan devices that are commonly attached to or mounted over CPUs in order to dissipate the heat generated by the CPU. The CPU 201 is a flat silicon chip enclosed within a container commonly made from plastic or ceramic materials. The model number and revision numbers of the CPU are generally stamped or printed on the upper surface of the container 202. A number of metal pins 203 extend perpendicular to the lower surface of the container. These pins 203, commonly made from gold or copper alloys, connect the CPU to the circuit board 204 of a computer system. Modem high-speed CPUs are commonly encased within an elaborate heat sink device 205, on top of which is mounted a large cooling fan 206. Removal of the cooling fan and heat sink may cause mechanical stress to the pins 203 which connect the CPU to the circuit board. If one of the pins is broken or dislocated, the CPU becomes useless. In addition, when tools or fingers contact the CPU assembly or circuit board, there is a chance of static discharge into the circuit board that can exceed the voltage limits for the delicate circuits and devices connected to the circuit board, thereby destroying the CPU or circuit board. For these reasons, it is desirable that the model and revision numbers for the processors included in the system can be determined in a manner other than by mechanically exposing the printed information on the surface of each processor.

If a CPU is to be added to a multiprocessor computer system, the additional CPU needs to be compatible with the model number and revision numbers of the CPUs already included in the multiprocessor computer system. Manufacturers of CPUs publish CPU compatibility information to facilitate the selection of compatible CPUs. Generally, as manufacturers begin to produce newer revisions of a CPU model, older revisions are discontinued. Therefore, selection of a compatible CPU to add to a system is not generally a simple matter of purchasing the same CPU as the CPUs already included in the system. The lag in time between manufacture of the system and the decision to add a new CPU may often exceed the span of time in which the revision of the CPU initially included in the system is available commercially. Alternatively, a multiprocessor computer owner may desire to replace a failed CPU with another CPU selected from previously-purchased spare CPUs. These spare CPUs may be older than the CPUs currently included in the multiprocessor computer system, again requiring the owner to ascertain which, if any, of the older spare CPUs are compatible with the CPUs currently included in the multiprocessor computer system.

FIG. 3 displays a sample portion of a CPU compatibility listing. In this compatibility listing, the CPUs currently available from the manufacturer are listed in the first column 301. Associated with each CPU model and revision number in the first column 301 is a listing of all compatible CPUs in the second column 302. In this example, the numbers prior to the hyphen in each value represent the model number, and the numbers following the hyphen represent the revision number. Thus, for example, row 303 indicates that revision 99 of processor model 936 is compatible with revisions 16, 56, and 98 of model 936. The compatibility listing of FIG. 3 is only one example of the different formats possible for such a listing. For example, the listing could be published as a square matrix cross-compatibility listing for all processors manufactured by one or more manufacturers, with the cells of the matrix indicating whether the processor corresponding to the row of the cell is compatible with the processor corresponding to the column of the cell.

Figure 4:
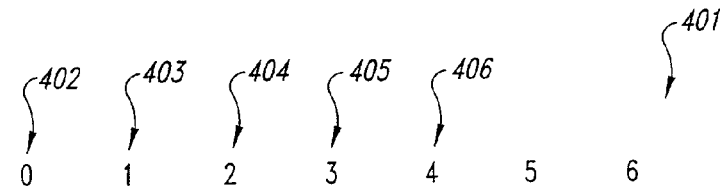
FIG. 4 shows the two-dimensional array "compatibilityTable" containing the compatibility information from the compatibility listing shown in FIG. 3.

In one embodiment, the information contained in the compatibility listings is input into a two-dimensional array or matrix. FIG. 4 shows the two-dimensional array "compatibilityTable" containing the compatibility information from the compatibility listing shown in FIG. 3. The first cell in each row, for example, cell [0,0] 401, contains an entry from the processor column 301 of FIG. 3. The remaining cells within a row, for example, cells [0,1], [0,2], [0,3], and [0,4] 402-405, each contains the model and revision numbers of a processor that is compatible with the processor identified in the first cell of the row. In this embodiment, the model and revision numbers are contained in the cells of the two-dimensional array "compatibilityTable" 401 combined within a single value having the data type "CPUID." The data type CPUID may be a fundamental data type of a program language, such as a floating point number or a character string, or may be a more complex, user-defined data type. Beginning from cell [0,0], all rows of the two-dimensional matrix "compatibilityTable" that contain data are packed closely together. Any unused or spare rows in compatibilityTable 401 are filled with zeroes to indicate that the rows are blank and occupy rows following the rows that contain data. In a similar fashion, all the CPUID values within a row are closely packed together starting from the left-hand cell within the row, and any spare or unfilled cells to the right of the last CPUID-containing cell in a row are filled with zeroes to indicate that the cells are blank and do not contain data. The two-dimensional array "compatibilityTable" may be a simple memory-based array declared within a program language, or may be a more complex, user-defined data type or class instance from which CPUID values can be retrieved by familiar array subscripting notation. In alternative embodiments, the information in a compatibility listing may be input into a large variety of different data structures, including one-dimensional arrays, lists, or more complex, user-defined data types and class instances. Comparison of FIG. 3 and FIG. 4 reveals that the information in the compatibility listing of FIG. 3 is laid out in nearly identical fashion within the two-dimensional array "compatibilityTable" of FIG. 4. In a preferred embodiment, the two-dimensional array "compatibilityTable" 401 is initially prepared from compatibility lists like that shown in FIG. 3 by the technical support department of a multiprocessor computer manufacturer. The two-dimensional array "CompatibilityTable" 401 is created to be persistent by any number of common techniques and is stored along with the program "CompatibleCPUs" to be described below. The two-dimensional array "CompatibilityTable" is thus a computer-readable version of the compatibility lists that are currently used for selecting compatible CPUs.

Figure 5:
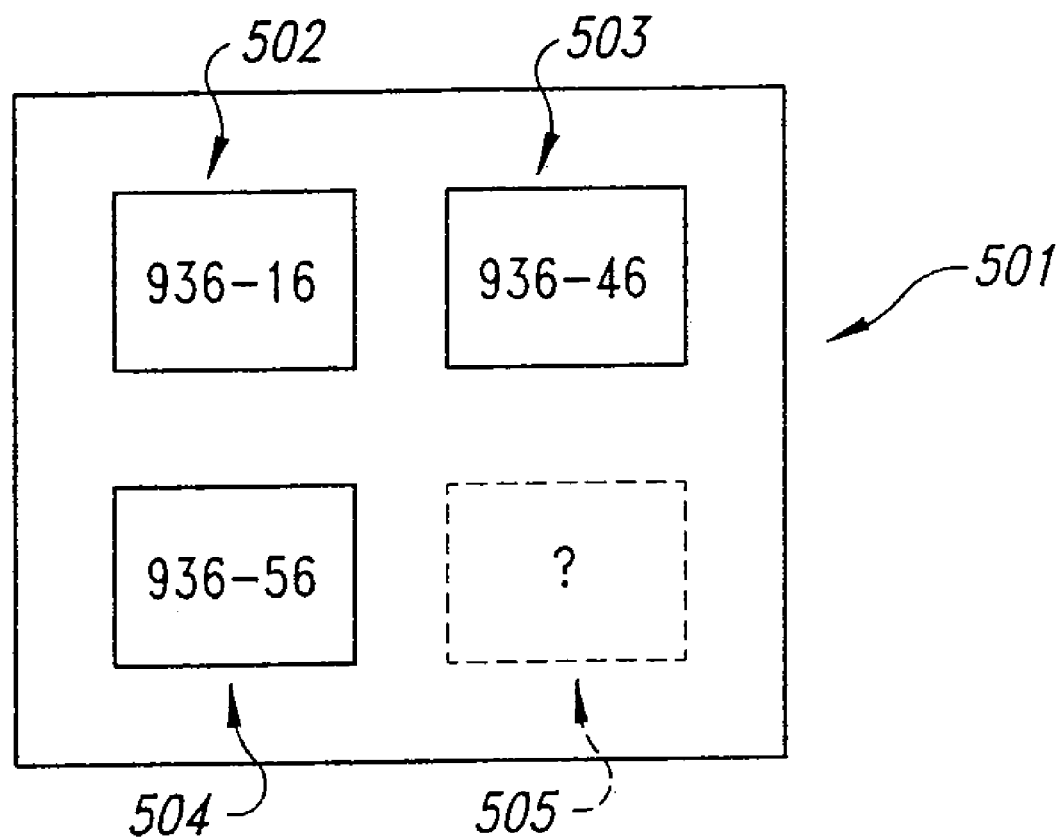
FIG. 5 illustrates schematically a multiprocessor computer system that is to be upgraded.

FIG. 5 illustrates schematically a multiprocessor computer system that is to be upgraded. The multiprocessor computer system 501 contains three CPUs 502, 503, and 504, as well as an expansion slot for one more additional CPU 505. The three CPUs currently in the computer system have model/revision numbers, or CPUIDs, equal to "936-16," "936-146," and "936-56." If the owner of this multiprocessor computer system wishes to add a fourth CPU to the system, the owner must determine the model/revision numbers, or CPUIDs, for processors compatible with all the processors currently in the computer system. If the owner had access to the compatibility listing of FIG. 3, for example, and if the owner was able to successfully expose the model and revision numbers of the CPUs within the owner's multiprocessor computer system, the owner could determine that the owner must purchase an additional CPU with a model/revision number of "936-80" or "936-84."

In one embodiment of the present invention, the owner of the computer system illustrated in FIG. 5 can determine the model/revision numbers of compatible CPUs for purchase by running the program "CompatibleCPUs" on a computer containing the program and the two-dimensional array "compatibilityTable" 401. Alternatively, the owner of the computer system might instead contact the technical department of the manufacturer of the computer system to obtain the compatibility information. In this case, the technical department would run the program "CompatibleCPUs" and return the compatibility information obtained from running the program to the owner of the computer system. As another alternative, the owner of the computer system might access a world wide web page via the Internet that allows the owner of the computer system to run the program "CompatibleCPUs" on a remote computer in order to obtain the compatibility information.

Figure 6:
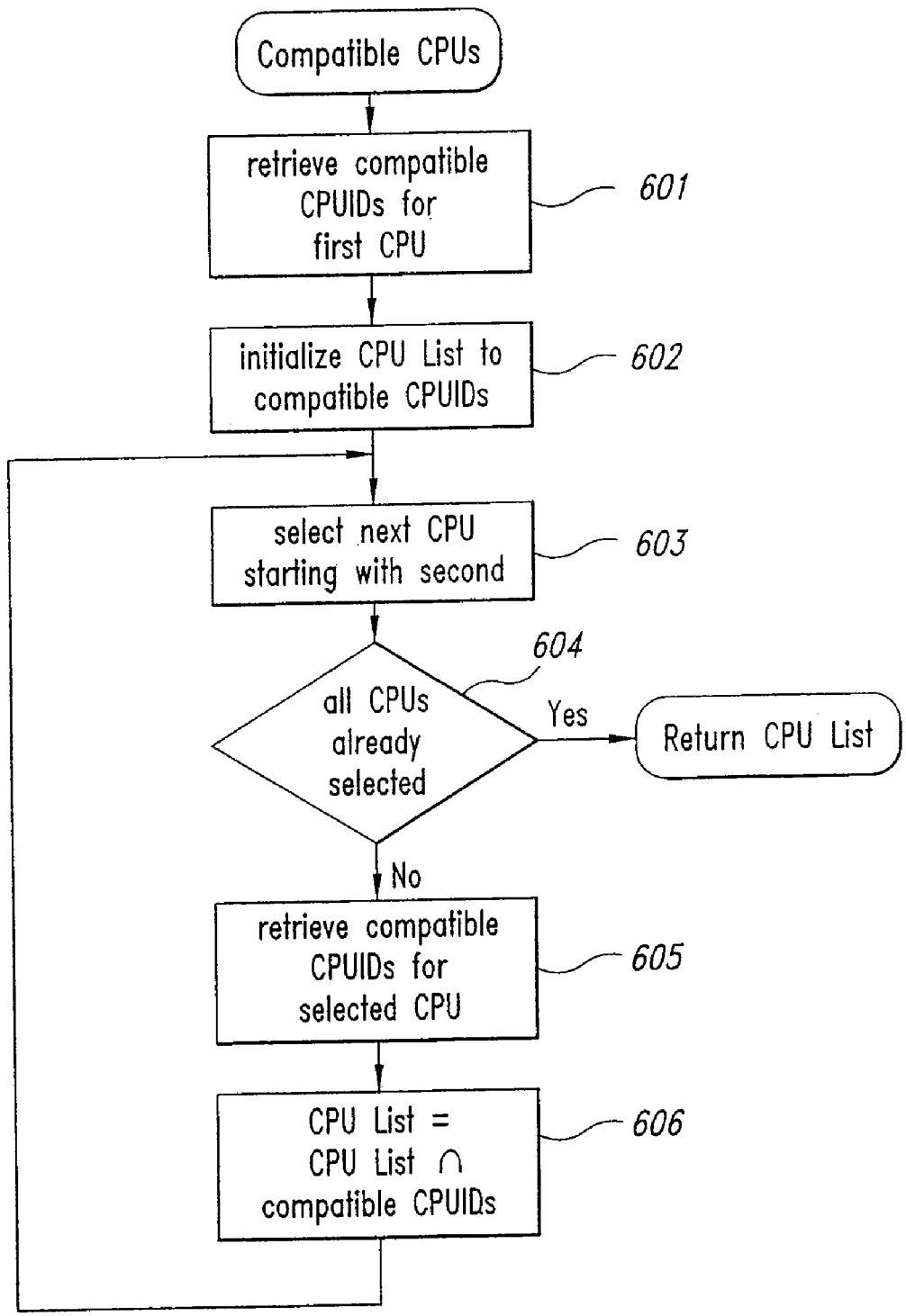
FIG. 6 is a flow control diagram for the program "Compatible CPUs."

FIG. 6 is a flow control diagram for the program "CompatibleCPUs." The CompatibleCPUs program is passed as input the two-dimensional array "compatibilityTable" 401, or a pointer to that array, and a list of the CPUIDs of the CPUs currently included in a computer system. In step 601, CompatibleCPUs retrieves the compatible CPUIDs from the CompatibilityTable for the first CPUID in the list passed. In step 602, CompatibleCPUs initializes a CPUList of compatible CPUs to the retrieved CPUIDs. Steps 603-606 represent a loop, during each iteration of which CompatibleCPUs retrieves the compatible CPUs for the next CPUID in the passed list and updates the CPUList so that it contains the CPUIDs compatible with the previous CPUIDs processed. In step 603, CompatibleCPUs selects the next CPUID starting with the second CPUID from the passed list. In step 604, if all the CPUIDs in the passed list have already been selected, then CompatibleCPUs returns with the CPUList. In step 605, CompatibleCPUs retrieves the compatible CPUIDs from the compatibilityTable for the selected CPUID. In step 606, CompatibleCPUs updates the CPUList to contain the intersection of the current CPUList and the retrieved CPUIDs. CompatibleCPUs then loops to step 603 to select the next CPUID in the passed list.

There are many different possible ways of implementing CompatibleCPUs, and there are a number of enhancements to the program that may improve performance of CompatibleCPUs for large compatibility tables. For example, the list of current CPUs supplied to CompatibleCPUs as an argument can be first sorted so that CPUs that have the least number of compatible CPUs occur first in the list. By sorting the list of compatible CPUs in this manner, a NULL or empty set result may be produced by compatible CPUs more quickly in the case that there are no CPUs compatible with all the current CPUs in a multi-CPU system. In such a case, the CompatibleCPUs program can check for such a condition.

As described above, it is possible that the program CompatibleCPUs will return a null or empty set indicating that there are no CPUs that are compatible with all the CPUs currently in the multiprocessor computer. For example, if CPU 504 in the above example of FIG. 5 had a model/revision number of "936-48," none of the processors in column 301 of the compatibility list in FIG. 3 would be compatible with all three processors in the example computer. In such a case, at least one of the three processors in the computer system would have to be replaced along with adding a new processor. By removing the processor with model/revision number "936-48," the computer owner could then install two new CPUs with model/revision numbers equal to "936-80" or "936-84." By removing the processor with model/revision number "936-46," the computer owner could then install two new CPUs with model/revision numbers equal to "936-82," "936-90," or "936-96." Thus, the program CompatibleCPUs may be enhanced to repeatedly try all combinations of CPUs having one less than the total number of CPUs currently in the system, in the case that there are more than one CPU and that no compatible CPUs are found for all of the CPUs originally included in the system.

Although the present invention has been described in terms of one embodiment, it is not intended that the invention be limited to this embodiment. Modifications within the spirit of the invention would be apparent to those skilled in the art. For example, the computer program that identifies compatible CPUs may reside on a centralized computer maintained by the technical support department of the multiprocessor computer manufacturer. Once the owner of the multiprocessor determines the model and revision numbers of all the processors in the owner's computer, the owner then furnishes those model and revision numbers to the technical support department. The technical support department then runs the computer program that determines the compatible processors, and reports the results back to the owner. In this type of system, the compatibility information collection is centralized with the technical support department, and updates to the information need only be made to the database managed by the technical support department. Alternatively, the entire compatible processor determination system can reside on each multiprocessor CPU system. With such a system, the owner of a multiprocessor computer system can determine the compatible CPUs by running one program on the multiprocessor system without calling the technical support department of the manufacturer. Such a system would be updated, from time to time, to reflect new revision information generated by the processor manufacturers. In another embodiment, the compatibility information can be accessed via the Internet from a site that is provided with the existing process model and revision numbers and returns an indication of the compatible processors. Also, the CPUID of an installed CPU may be obtained by executing an instruction on that installed CPU such as the "CPUID" instruction of the Intel Pentium processors. Alternatively, information describing the CPUIDs of the installed CPUs may be stored persistently and updated whenever a CPU is changed or added. A program can be used to then access these persistently stored CPUIDs. Also, it may be possible to determine the CPUID of a processor or a range possible CPUIDs by executing a predefined set of instructions and analyzing the results of the execution. For example, the speed of execution may help to identify the CPUID, or a certain instruction that causes an exception when executed on some CPUs may help to identify the CPUID. The scope of the present invention is defined by the claims that follow.

The invention claimed is:

1. A method of selecting a compatible processor for addition to a multiprocessor computer, the multiprocessor computer having at least one current processor, the method comprising:
   receiving identifying information indicative of the identity of each current processor;
   accessing stored processor compatibility information identifying processors that are compatible with a plurality of processors that includes each of the at least one current processors;
   executing a computer program comparing the identifying information for each current processor in the multiprocessor computer with the accessed processor compatibility information to determine the processors that are compatible with each current processor; and
   providing information identifying the processors that are compatible with each current processor.

2. The method of claim 1 wherein the act of executing a computer program comparing the identifying information for each current processor in the multiprocessor computer with the processor compatibility information comprises executing a computer program using a computer that is remote from the multiprocessor computer to compare the identifying information for each current processor in the multiprocessor computer with the processor compatibility information.

3. The method of claim 1 further comprising storing the processor compatibility information includes storing processor compatibility information in a computer that is remote from the multiprocessor computer and connected to the multiprocessor computer system via an internet.

4. The method of claim 1 wherein the act of executing a computer program comparing the identifying information for each current processor in the multiprocessor computer with the processor compatibility information comprises executing a computer program on the multiprocessor computer that compares the identifying information for each current processor in the multiprocessor computer with the processor compatibility information.

5. The method of claim 1 wherein the act of providing information identifying the processors that are compatible with each current processor comprises displaying information identifying the processors that are compatible with each current processor.

6. A method of selecting a compatible processor for addition to a multiprocessor computer, the multiprocessor computer having at least one current processor, the method comprising:
   executing a computer program directing each of the at least one current processors to execute at least one instruction that allows the identity of each current processor to be determined, the computer program providing identifying information indicative of the identity of each current processor;
   transmitting the identifying information indicative of the identity of each current processor to a remote computer configured to access stored processor compatibility information identifying processors that are compatible with a plurality of processors that includes each of the at least one current processors; and
   receiving from the remote computer information identifying the processors that are compatible with each current processor, the information identifying the processors obtained at least in part by comparing the identifying information for each current processor in the multiprocessor computer with the accessed processor compatibility information.

7. A method of evaluating a new processor for addition to a multiprocessor computer, the multiprocessor computer having at least one current processor, the method comprising:
   receiving identifying information indicative of the identity of each current processor;
   accessing stored processor compatibility information identifying processors that are compatible with a plurality of processors that includes at least one current processor;
   executing a computer program comparing the identifying information for each current processor in the multiprocessor computer with the stored processor compatibility information to determine the processors that are compatible with each current processor, the computer program further comparing identifying information for the new processor with the processors determined to be compatible with each current processor; and
   providing an indication whether or not the new processor is compatible before adding the new processor to the multiprocessor computer.

8. The method of claim 7 wherein the act of executing a computer program comparing the identifying information for each current processor in the multiprocessor computer with the processor compatibility information comprises executing a computer program using a computer that is remote from the multiprocessor computer to compare the identifying information for each current processor in the multiprocessor computer with the processor compatibility information.

9. The method of claim 7 wherein the act of executing the computer program that compares the identifying information for the new processor with the processors determined to be compatible with each current processor comprises using a computer that is remote from the multiprocessor computer to compare the identifying information for the new processor with the processors determined to be compatible with each current processor.

10. The method of claim 7 wherein the act of providing the indication comprises using a computer that is remote from the multiprocessor computer to provide the indication.

11. The method of claim 7 further comprising storing the processor compatibility information in a computer that is remote from the multiprocessor computer and connected to the multiprocessor computer system via an internet.

12. The method of claim 7 wherein the act of executing a computer program comparing the identifying information for each current processor in the multiprocessor computer with the processor compatibility information comprises executing a computer program on the multiprocessor computer that compares the identifying information for each current processor in the multiprocessor computer with the processor compatibility information.

13. A method of evaluating a new processor for addition to a multiprocessor computer, the multiprocessor computer having at least one current processor, the method comprising:
   executing a computer program on the multiprocessor computer directing each of the at least one current processor to execute at least one instruction that allows the identity of each current processor to be determined, the computer program providing identifying information indicative of the identity of each current processor;
   transmitting the identifying information indicative of the identity of each current processor and identifying information indicative of the identity of the new processor to a remote computer configured to access stored processor compatibility information identifying processors that are compatible with a plurality of processors that includes each of the at least one current processors; and receiving from the remote computer an indication whether or not the new processor is compatible before adding the new processor to the multiprocessor computer, the indication determined at least in part by comparing the identifying information for each current processor in the multiprocessor computer with the accessed processor compatibility information to determine the processors that are compatible with each current processor and comparing identifying information for the new processor with the processors determined to be compatible with each current processor.

14. A system for selecting a new processor for addition to a multiprocessor computer having at least one current processor, the system comprising:

a memory configured to store processor compatibility information indicative of processors that are compatible with a plurality of processors that includes each current processor;

a first processor coupled to the memory and configured to access the processor compatibility information, the first processor further configured to receive identifying information indicative of each current processor in the multiprocessor computer, determine the processors that are compatible with the at least one current processor, and provide information identifying the processors that are compatible with each current processor before a new processor is added to the multiprocessor computer.

15. The system of claim 14 wherein the memory is configured to store processor compatibility information indicative of processors that are compatible with a plurality of processors that includes each current processor.

16. The system of claim 14 wherein the memory is remote from the multiprocessor computer, the memory coupled to the multiprocessor computer and configured to store processor compatibility information indicative of processors that are compatible with a plurality of processors that includes each current processor.

17. The system of claim 16 wherein the memory is coupled to the multiprocessor computer via an internet.

18. The system of claim 14 wherein the first processor is remote from the multiprocessor computer, the first processor being in communication with the multiprocessor computer and configured to access the processor compatibility information using the information identifying each current processor in the multiprocessor computer to determine the processors that are compatible with the at least one current processor.

19. The system of claim 14 wherein the first processor is in communication with a display that is operable to display the information identifying the processors that are compatible with each current processor before adding the new processor to the multiprocessor computer.

* * * * *